(12) United States Patent
Terakawa et al.

(10) Patent No.: US 9,419,266 B2
(45) Date of Patent: Aug. 16, 2016

(54) POLYOLEFIN RESIN POROUS FILM, AND NON-AQUEOUS ELECTROLYTE CELL SEPARATOR USING SAME

(75) Inventors: Toru Terakawa, Nagahama (JP); Takeyoshi Yamada, Nagahama (JP); Yasushi Usami, Nagahama (JP)

(73) Assignee: Mitsubishi Plastics, Inc., Tokyo (JP)

( * ) Notice: Subject to any disclaimer, the term of this patent is extended or adjusted under 35 U.S.C. 154(b) by 25 days.

(21) Appl. No.: 13/979,933

(22) PCT Filed: Jan. 23, 2012

(86) PCT No.: PCT/JP2012/051363
§ 371 (c)(1),
(2), (4) Date: Jul. 16, 2013

(87) PCT Pub. No.: WO2012/102241
PCT Pub. Date: Aug. 2, 2012

(65) Prior Publication Data
US 2013/0288132 A1 Oct. 31, 2013

(30) Foreign Application Priority Data

Jan. 27, 2011 (JP) ................................. 2011-014977

(51) Int. Cl.
*H01M 10/0562* (2010.01)
*H01M 6/18* (2006.01)
(Continued)

(52) U.S. Cl.
CPC ............ *H01M 2/1653* (2013.01); *B32B 3/266* (2013.01); *B32B 15/085* (2013.01); *B32B 15/20* (2013.01);
(Continued)

(58) Field of Classification Search
CPC ......... H01M 2/162; H01M 2/16; H01M 2/14; H01M 10/0564; H01M 10/0565
USPC .................................. 429/249, 247, 306, 250
See application file for complete search history.

(56) References Cited

U.S. PATENT DOCUMENTS 7,235,203 B2 * 6/2007 Sadamitsu et al. ......... 264/210.7
2001/0038942 A1 11/2001 Fisher et al.
(Continued)

FOREIGN PATENT DOCUMENTS

JP 5 310989 11/1993
JP 2000-030683 1/2000
(Continued)

OTHER PUBLICATIONS

Extended Search Report issued Oct. 8, 2014 in European Patent Application No. 12739529.1.
(Continued)

*Primary Examiner* — Patrick Ryan
*Assistant Examiner* — Julian Anthony
(74) *Attorney, Agent, or Firm* — Oblon, McClelland, Maier & Neustadt, L.L.P.

(57) ABSTRACT

This polyolefin resin porous film can be easily produced, and when used as a non-aqueous electrolyte cell separator, can suppress clogging and can evince a high cell output. The polyolefin resin porous film is a porous film having a polyolefin resin as the primary component and is characterized by the average flow diameter pressure ($P_{AP}$) being 1500-2500 kPa, the bubble point pressure ($P_{BP}$) being 300-1500 kPa, and the ratio (Pa/$P_{AP}$) of the air permeability (Pa) and the bubble point pressure ($P_{BP}$) being no greater than 0.35 sec/(100 ml·kPa).

8 Claims, 2 Drawing Sheets

(51) Int. Cl.
*H01M 2/16* (2006.01)
*C08J 5/18* (2006.01)
*B32B 15/085* (2006.01)
*B32B 15/20* (2006.01)
*B32B 27/08* (2006.01)
*B32B 27/32* (2006.01)
*B32B 3/26* (2006.01)

(52) U.S. Cl.
CPC ............... *B32B 27/08* (2013.01); *B32B 27/32* (2013.01); *C08J 5/18* (2013.01); *B32B 2307/518* (2013.01); *B32B 2307/724* (2013.01); *B32B 2437/00* (2013.01); *B32B 2439/70* (2013.01); *B32B 2457/10* (2013.01); *C08J 2323/02* (2013.01)

(56) References Cited

U.S. PATENT DOCUMENTS

| | | | |
|---|---|---|---|
| 2002/0148723 A1* | 10/2002 | Takata et al. | 204/252 |
| 2004/0096744 A1 | 5/2004 | Sadamitsu et al. | |
| 2005/0019665 A1 | 1/2005 | Adachi et al. | |
| 2007/0178324 A1* | 8/2007 | Masuda et al. | 428/500 |
| 2007/0269719 A1 | 11/2007 | Sadamitsu et al. | |
| 2012/0101180 A1 | 4/2012 | Yamada et al. | |
| 2013/0017430 A1 | 1/2013 | Terakawa et al. | |

FOREIGN PATENT DOCUMENTS

| | | | |
|---|---|---|---|
| JP | 2000 348703 | | 12/2000 |
| JP | 2002-284918 A | † | 10/2002 |
| JP | 4098401 | | 6/2008 |
| JP | 2009-043485 | | 2/2009 |
| JP | 4220329 | | 2/2009 |
| JP | 4838910 | | 10/2011 |
| WO | 02 066233 | | 8/2002 |
| WO | 2004 020511 | | 3/2004 |
| WO | 2010074151 | † | 7/2010 |

OTHER PUBLICATIONS

Ganesh Venugopal, et al., "Characterization of microporous separators for lithium-ion batteries", Journal of Power Sources, vol. 77, No. 1, XP004156278, Jan. 1999, pp. 34-41.

Jena A., et a."Characterization of Pore Structure of Filter Media", Tutorial Papers, Fluid/Particle Separation Journal, vol. 14, No. 3, XP009175650, Jan. 2002, pp. 227-241.

International Search Report Issued Feb. 21, 2012 in PCT/JP12/051363 Filed Jan. 23, 2012.

Third Party Observation mailed Sep. 23, 2013 in Application No. 12739529.1-1303 PCT/JP2012051363.

U.S. Appl. No. 14/406,011, filed Dec. 5, 2014, Yamada, et al.

\* cited by examiner
† cited by third party

POLYOLEFIN RESIN POROUS FILM, AND NON-AQUEOUS ELECTROLYTE CELL SEPARATOR USING SAME

TECHNICAL FIELD

The present invention relates to a porous film containing polyolefin resin as its main component and can be utilized as materials for packing, hygiene, livestock, agricultural, building, medical use, a separation film, a light diffusing plate, and a separator for a battery. The present invention particularly relates to a porous film which can be preferably used as a separator for a nonaqueous electrolyte battery such as a lithium-ion secondary battery which can be utilized as a power source of various electronic devices and the like.

BACKGROUND ART

A porous polymeric film having a large number of intercommunicable micropores is utilized in various fields such as the separation film to be used to produce ultrapure water, purify chemicals, and treat water; a waterproof moisture-permeable film for use in clothes and sanitary materials; and the separator for batteries.

Secondary batteries repeatingly chargeable and dischargeable are widely used as the power source of OA, FA, and portable devices such as household electric appliances, communication devices, and the like. A lithium-ion secondary battery has a favorable volumetric efficiency when it is mounted on devices and allows the devices to be compact and lightweight. Therefore there is a large increase in the use of the portable devices in which the lithium-ion secondary battery is used.

Owing to research and development of a large secondary battery which have been made to use it in the field of load leveling, a UPS, an electric car and in many fields relating to energetic and environmental problems, the lithium-ion secondary battery which is a kind of a nonaqueous electrolytic solution secondary battery has widely spread in its use because the lithium-ion secondary battery has a large capacitance, a high output, a high voltage, and an excellent long-term storage stability.

The lithium-ion secondary battery is so designed that the upper limit of the working voltage thereof is 4.1V to 4.2V. Because electrolysis occurs in an aqueous solution at such a high voltage, the aqueous solution cannot be used as an electrolytic solution. Therefore a so-called nonaqueous electrolytic solution containing an organic solvent is used as an electrolytic solution capable of withstanding a high voltage.

As a solvent for use in the nonaqueous electrolytic solution, an organic solvent having a high permittivity which allows a large number of lithium ions to be present therein is used. An organic carbonate ester such as polypropylene carbonate and ethylene carbonate is mainly used as the organic solvent having a high permittivity. As a supporting electrolyte serving as a lithium ion source in the solvent, an electrolyte such as lithium phosphate hexafluoride or the like having a high reactivity is used by dissolving it in the solvent.

The separator is interposed between the positive electrode of the lithium-ion secondary battery and its negative electrode to prevent an internal short circuit from occurring. Needless to say, the separator is demanded to have electrical insulating properties as its role. The separator is also required to be stable in an organic electrolytic solution. It is also necessary that the separator has a microporous structure to retain the electrolytic solution and secure a passage to allow lithium ions to move between electrodes in charge and discharge. To satisfy these demands, a porous film containing an insulation material such as polyolefin as its main component is used as the separator. Because the porous structure of the separator greatly affects the output of the lithium-ion secondary battery, the characteristic features of the lithium-ion secondary battery are in discussion by using various parameters for evaluating the porous structure.

The method of producing the separator is classified into two kinds, namely, a wet type method and a dry type method. There is a great difference between the porous structure formed by using the wet type method and that formed by the dry type method.

The wet-type production method includes the step of mixing polyethylene resin and an addition component such as a plasticizer with each other and molding the mixture into a sheet and the step of extracting the addition component with a solvent and thereafter stretching the sheet-shaped mixture or stretching the sheet-shaped mixture and thereafter extracting the addition component with the solvent to form the porous structure. This method is capable of forming a three-dimensional porous structure.

The dry-type production method includes the step of melting and extruding crystalline polyolefin resin, the step of cooling the polyolefin resin at a high draft ratio to solidify it to form a highly anisotropic sheet of the polyolefin resin, and the step of stretching the produced sheet in a mechanical direction to form the porous structure. This method is capable of forming a two-dimensional porous structure long in the mechanical direction.

Various porous structure-controlled separators have been proposed. Descriptions are made in specifications that the characteristic features of batteries are displayed according to the porous structures.

Description is made in the specification of U.S. Pat. No. 4,098,401 (patent document 1) that the cycle characteristic can be improved by decreasing the air permeability of the separator. Description is made in the specification of U.S. Pat. No. 4,220,329 (patent document 2) that the discharge characteristic and output of the separator are evaluated based on the ratio between the amount of permeated moisture and that of permeated air. Description is also made in the specification of the patent document 2 that when the average flow rate diameter pressure of the separator is low, i.e., when the diameter of a pore is large, the cycle characteristic of the separator is excellent. The dry-type separator disclosed in Japanese Patent Application Laid-Open No. 2000-348703 (patent document 3) is composed of the resin having a low melting point to make the air permeability thereof low.

PRIOR ART DOCUMENT

Patent Document

Patent document 1: U.S. Pat. No. 4,098,401
Patent document 2: U.S. Pat. No. 4,220,329
Patent document 3: Japanese Patent Application Laid-Open No. 2000-348703

SUMMARY OF THE INVENTION

Problems to be Solved by the Invention

But the method described in the patent documents 1 and 2 have a problem that the large pore diameter increases the risk of the occurrence of a short-circuit when the lithium dendrite is deposited. Thus the battery has a low level of safety. The separator proposed in the patent document 3 has low air permeability. Because the unporous membrane material composed of the resin composition of the separator is stretched in only the mechanical direction, the diameter of the pore is small. Therefore there is a fear that the separator is liable to clog and thus the cycle characteristic of the battery deteriorates. There is also a fear that the battery has a high internal resistance and a low output.

The present invention has been made in view of the above-described problems. Thus it is an object of the present invention to provide a porous olefin resin film which has pores whose diameters are so set as to restrain a short circuit and clogging from occurring, even though lithium dendrite which is an electric charge is deposited and yet the porous olefin resin film allows a nonaqueous electrolyte battery to display a high output in the case where the porous polyolefin resin film is used as a separator for the nonaqueous electrolyte battery.

Means for Solving the Problem

To solve the above-described problems, the present invention provides a porous polyolefin resin film containing polyolefin resin as a main component thereof, wherein an average flow rate diameter pressure ($P_{AP}$) is set to 1500 to 2500 kPa; a bubble point pressure ($P_{BP}$) is set to 300 to 1500 kPa; and a ratio of an air permeability (Pa) to the bubble point pressure ($P_{BP}$) is set to not more than 0.35 seconds/(100 ml·kPa).

It is preferable that the air permeability (Pa) of the porous olefin resin film is set to not more than 2000 seconds/100 ml.

It is preferable that a ratio of the air permeability (Pa) of the porous olefin resin film of the present invention to the average flow rate diameter pressure ($P_{AP}$) thereof is set to not more than 0.18 seconds/(100 ml·kPa).

It is preferable that the polyolefin resin of the porous polyolefin resin film of the present invention contains not less than 30 mass % of polypropylene resin.

It is preferable that the polyolefin resin of the porous olefin resin film of the present invention has a β crystal activity.

It is preferable that the porous olefin resin film of the present invention has an electric resistance of not more than 0.85Ω.

It is preferable that the porous olefin resin film of the present invention has a porosity of 20 to 80%.

It is preferable that the porous olefin resin film of the present invention has a thickness of 3 to 100 µm.

Effect of the Invention

The porous polyolefin resin film of the present invention can be easily produced. The porous polyolefin resin film has pores whose diameters are so set as to restrain a short circuit and clogging from occurring, even though lithium dendrite which is an electric charge is deposited and yet the porous polyolefin resin film allows a nonaqueous electrolyte battery to display a high output. Therefore the porous polyolefin resin film can be preferably used as the separator for the nonaqueous electrolyte battery demanded to have a high output.

MODE FOR CARRYING OUT THE INVENTION

Figure 1:
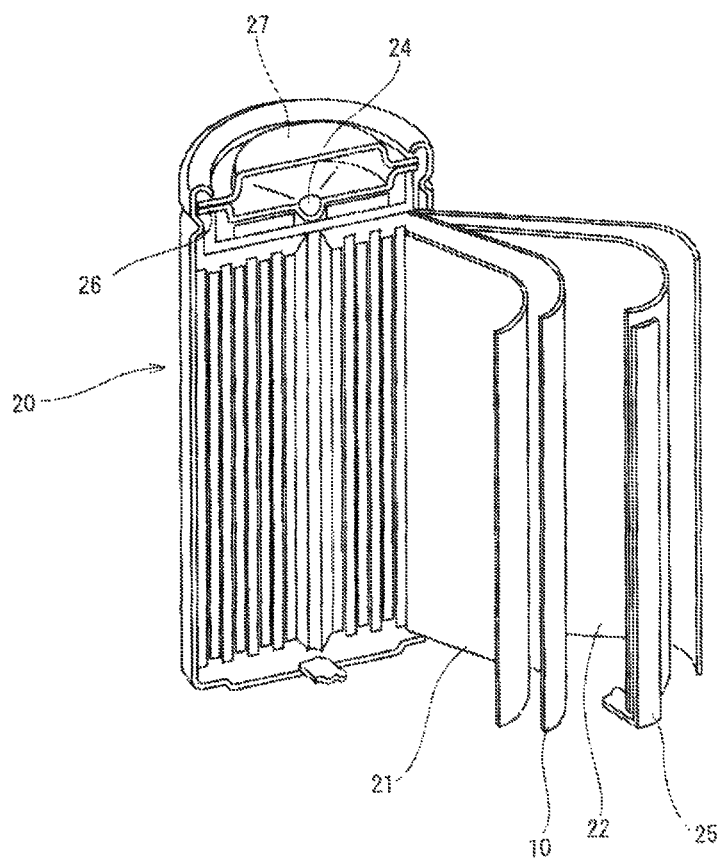
FIG. 1 is a schematic sectional view of a battery accommodating a porous polyolefin resin film of the present invention.

The embodiments of the porous polyolefin resin film of the present invention are described in detail below.

In the present invention, unless specifically described, the expression of "main component" includes a meaning in which the porous polyolefin resin film may contain components other than the main component in a range where other components do not prevent the main component from normally functioning. Although the content rate of the main component is not specified, the expression of the "main component" also means that the main component is contained in the porous polyolefin resin film at not less than 50 mass %, favorably not less than 70 mass %, and especially favorably not less than 90 mass % (including 100%).

Unless otherwise described, the description of "X to Y" (X, Y are arbitrary numerals) is intended to mean "not less than X nor more than Y".

Although the porous film of this embodiment contains polyolefin resin as its main component, the porous film may contain a plurality of polyolefin resins having different structures. The porous film may also contain other components such as resin components other than the polyolefin, an oligomer, and a low-molecular-weight compound. In the case where a plurality of the resins is used or the other components are used for the porous film, they may be compatible with each other or the layers thereof may separate from each other. That is, there is no restriction in a dispersion state. A plurality of the resins or the other components may be used in a structure in which the layers thereof are laminated one upon another. As the method of laminating the layers thereof one upon another, it is possible to use various methods such as a co-extrusion method, a lamination method, and a coating method.

The polyolefin resin composing the porous polyolefin resin film of the present invention is described in detail below. But the polyolefin resin is not limited to those described below.

As the polyolefin resin, polyethylene, polypropylene, poly (1-butene), poly(1-pentene), poly(1-methylpentene), poly(1-hexane), poly(1-heptene), poly(1-octene), poly(1-nonene), and poly(1-decene) are listed. These polyolefin resins may be a homopolymer or a copolymer of olefin monomers or may be composed of a copolymer formed by copolymerizing the olefin monomers and monomers other than the olefin monomers with each other.

Of these polyolefin resins, the polypropylene resin can be preferably used from the standpoint of its material cost, processability, mechanical strength, and heat resistance. From the standpoint of the securing of the safety of a battery when the porous polyolefin resin film is used as a separator therefor, the polyethylene resin can be also preferably used. As one of indexes showing the safety of the battery, a shut-down property (hereinafter referred to as "SD property") is known. The SD property has the function of cutting off electric current owing to closing of the porous structure of the separator when heat is abnormally generated by an external short circuit of the battery. The SD property is frequently generated owing to melting of at least one of the components of the separator when heat is generated. The melting point of the polyethylene resin is often preferably utilized as a temperature at which the SD property develops.

In the case where the polypropylene resin or the polyethylene resin is used, it is possible to use only one of the polypropylene resin and the polyethylene resin or both of them as necessary. In the case where both of them are used, of the polyolefin resins, it is favorable to use not less than 30 percent by mass of the polypropylene resin, more favorable to use not less than 40 percent by mass thereof, and most favorable to use not less than 50 percent by mass thereof. In the case where the porous film contains not less than 30 percent by mass of the polypropylene resin, the porous film is capable of having a sufficient mechanical strength or heat resistance.

As the polypropylene resin, homopolypropylene (propylene homopolymer) and random copolymers or block copolymers each consisting of propylene and α-olefin such as ethylene, 1-butene, 1-pentene, 1-methylpentene, 1-hexene, 1-heptene, 1-octene, 1-nonen or 1-decene are listed. To allow the porous film to have a high mechanical strength, the homopolypropylene can be used more favorably than the above-described other polypropylene resins as the polypropylene resin.

The isotactic pentad fraction of the polypropylene resin showing tacticity is favorably 80 to 99%, more favorably 83 to 99%, and most favorably 85 to 99%. In the case where the isotactic pentad fraction is less than 80%, there is a fear that the mechanical strength of the laminated porous film is low. On the other hand, the upper limit of the isotactic pentad fraction is specified by an upper limit value industrially obtained at the present time. But in the case where a resin having a higher regularity at an industrial level is developed in the future, there is a possibility that the upper limit of the isotactic pentad fraction is altered.

The isotactic pentad fraction means a three-dimensional structure in which all of five methyl groups which are side chains branched from a main chain consisting of a carbon-carbon bond composed of arbitrary continuous five propylene units are positioned in the same direction or the ratio of the three-dimensional structure. The attribution of a signal in a methyl group region conforms to A. Zambelli et al. (Macromolecules 8, 687 (1975)).

It is favorable that the polydispersity degree (ratio of weight-average molecular weight Mw to number average molecular weight Mn, shown by Mw/Mn) which is a parameter showing the molecular-weight distribution of the polypropylene resin is 1.5 to 10.0. The polypropylene resin having the ratio of Mw/Mn in a range of 2.0 to 8.0 is more favorably used. The polypropylene resin having the ratio of Mw/Mn in a range of 2.0 to 6.0 is most favorably used. The smaller is the ratio of Mw/Mn, the narrower is the molecular-weight distribution. By setting the ratio of Mw/Mn to not less than 1.5, the porous polyolefin resin film is allowed to obtain sufficient extrusion moldability and thus an industrially stable productivity. On the other hand, by setting the ratio of Mw/Mn to not more than 10.0, the porous polyolefin resin film is allowed to obtain a sufficient mechanical strength.

The ratio of Mw/Mn is obtained by a GPC (gel permeation chromatography) method.

Although the melt flow rate (MFR) of the polypropylene resin is not limited to a specific value, it is favorable to set the MFR thereof to 0.1 to 15 g/10 minutes and more favorable to set the MFR to 0.5 to 10 g/10 minutes. By setting the MFR thereof to not less than 0.1 g/10 minutes, it is possible to obtain sufficient melt viscosity of the resin at a molding process time and thus securely obtain sufficient productivity. On the other hand, by setting the MFR thereof to not more than 15 g/10 minutes, the porous polyolefin resin film is allowed to obtain a sufficient mechanical strength.

The MFR is measured in accordance with JIS K7210 in a condition where temperature is 190° C., and a load is 2.16 kg.

To modify and thermally stabilize the polypropylene resin, it is possible to use other resins and various kinds of additives by mixing them with the polypropylene resin. Because the polypropylene resin has tertiary carbons in its framework, the polypropylene resin is liable to deteriorate. Thus an antioxidant and a heat stabilizer are often added to the polypropylene resin. As the antioxidant, hindered phenols and hindered amines are known. As the heat stabilizer, a phosphorus-based stabilizer and a sulfur-based stabilizer are known.

To allow the porous polyolefin resin film to obtain a necessary porous structure in the case where it is used as the separator for the nonaqueous electrolyte battery, it is preferable to add a compound F which serves as the starting point of the generation of pores to the propylene resin. As the compound F, it is possible to exemplify filler compounds incompatible with the polypropylene resin. Polymer fillers, organic fillers, and inorganic fillers are listed as such filler compounds. In addition, it is possible to exemplify a β crystal nucleating agent which allows the polypropylene resin to form a β crystal when the melted polypropylene resin is cooled. When the filler compound is stretched, it separates from the polypropylene resin at the interface between it and the polypropylene resin to form pores. The β crystal nucleating agent allows the β crystal to be formed by cooling the melted polypropylene resin in a specific condition to solidify it. When the polypropylene resin is stretched, the β crystal is destroyed to form the pores. Therefore it is preferable to use the β crystal nucleating agent to allow the pores to intercommunicate with one another and the porous polyolefin resin film to have a high mechanical strength.

It is necessary to appropriately adjust the mixing ratio of the β crystal nucleating agent to be added to the polypropylene resin according to the kind of the β crystal nucleating agent or the composition of a resin composition containing the polypropylene resin as its main component. It is favorable to add 0.0001 to 5.0 parts by mass of the β crystal nucleating agent, more favorable to add 0.001 to 3.0 parts by mass thereof, and most favorable to add 0.01 to 1.0 part by mass thereof to 100 parts by mass of the resin composition containing the polypropylene resin as its main component. By adding not less than 0.0001 parts by mass of the β crystal nucleating agent to 100 parts by mass of the resin composition containing the polypropylene resin as its main component, it is possible to sufficiently generate and grow the β crystal of the resin composition containing the polypropylene resin as its main component at a production time. The porous film processed from the resin composition is allowed to securely obtain sufficient β crystal activity and desired air-permeable performance. By adding not more than 5.0 parts by mass of the β crystal nucleating agent to 100 parts by mass of the resin composition containing the polypropylene resin as its main component, economic advantage can be obtained and in addition, the β crystal nucleating agent is unlikely to bleed to the surface of the porous polyolefin resin film, which is preferable.

In the case where a layer containing the polypropylene resin is laminated on the layer consisting of the resin composition containing the polypropylene resin as its main component, the addition amounts of the β crystal nucleating agents of the respective layers may be equal to each other or different from each other. By changing the addition amount of the β crystal nucleating agent, the porous structure of each layer can be appropriately adjusted.

It is preferable that the porous polyolefin resin film has the β crystal activity. The β crystal activity can be considered as an index indicating that the resin composition containing the polypropylene resin as its main component has generated the β crystal in an unstretched membrane material composed of the resin composition. When the resin composition of the membrane material has generated the β crystal in the unstretched membrane material, micropores are formed therethrough by stretching the unstretched membrane material. Thereby it is possible to obtain the porous polyolefin resin film having an air-permeable characteristic.

The β crystal activity is measured in both the case where the porous polyolefin resin film has a single-layer structure and the case where the porous polyolefin resin film has a multi-layer structure composed of a plurality of porous layers laminated one upon another.

Whether the porous polyolefin resin film of the present invention has the "β crystal activity" is determined according to whether a crystalline melting peak temperature derived from the β crystal is detected by using a differential scanning calorimeter and/or according to whether a diffraction peak derived from the β crystal is detected in measurement (described later) conducted by using a wide angle X-ray diffraction apparatus.

More specifically, after the temperature of the porous polyolefin resin film is raised from 25° C. to 240° C. at a heating speed of 10° C./minute, the porous polyolefin resin film is allowed to stand for one minute. After the temperature of the porous polyolefin resin film is dropped from 240° C. to 25° C. at a cooling speed of 10° C./minute, the porous polyolefin resin film is allowed to stand for one minute. Thereafter the temperature of the porous polyolefin resin film is raised again from 25° C. to 240° C. at the heating speed of 10° C./minute. In the case where a crystalline melting peak temperature (Tmβ) derived from the β crystal of the resin composition containing the polypropylene resin as its main component is detected at this time, it is determined that the porous polyolefin resin film has the β crystal activity.

The degree of the β crystal activity of the porous polyolefin resin film is computed based on an equation shown below by using a detected crystalline melting heat amount (ΔHmα) derived from an α crystal of the resin composition containing the polypropylene resin as its main component and a detected crystalline melting heat amount (ΔHmβ) derived from the β crystal thereof.

β crystal activity degree (%)=[ΔHmβ/(ΔHmβ+ ΔHmα)]×100

For example, in the case where the homopolypropylene is used as the polypropylene resin, the β crystal activity degree can be computed from the crystalline melting heat amount (ΔHmβ), derived from the β crystal, which is detected mainly in a range not less than 145° C. and less than 160° C. and from the crystalline melting heat amount (ΔHmα), derived from the α crystal, which is detected mainly in a range not less than 160° C. nor more than 170° C. In the case where random polypropylene containing 1 to 4 mol of ethylene copolymerized with polypropylene is used as the polypropylene resin, the β crystal activity degree can be computed from the crystalline melting heat amount (ΔHmβ), derived from the β crystal, which is detected mainly in a range not less than 120° C. and less than 140° C. and from the crystalline melting heat amount (ΔHmα), derived from the α crystal, which is detected mainly in a range not less than 140° C. nor more than 165° C.

It is preferable that the porous polyolefin resin film has the β crystal activity degree at a high percentage. It is favorable to set the β crystal activity degree to not less than 20%, more favorable to set it to not less than 40%, and especially favorable to set it to not less than 60%. By setting the β crystal activity degree of the porous film to not less than 20%, a large number of the β crystal of the polypropylene resin can be generated in the unstretched membrane material, and in addition, a large number of micropores can be formed homogeneously by stretching the unstretched membrane material. Consequently it is possible to form the porous polyolefin resin film having a high mechanical strength and an excellent air-permeable performance and thus use the porous polyolefin resin film as the separator for the battery.

Although the upper limit value of the β crystal activity degree is not limited to a specific value, the higher is the β crystal activity degree, the more effectively the above-described effect can be obtained. Therefore it is preferable that the upper limit of the β crystal activity degree is as close to 100% as possible.

Whether the porous polyolefin resin film has the β crystal activity can be also determined based on a diffraction profile to be obtained by conducting wide-angle X-ray diffraction measurement of the porous film subjected to specific heat treatment.

In detail, after the porous polyolefin resin film is thermally treated at 170° C. to 190° C. higher than the melting point of the resin composition containing the polypropylene resin as its main component, the porous film in which the β crystal has been generated and grown is gradually cooled to carry out the wide-angle X-ray measurement thereof. When a diffraction peak derived from a (300) plane of the β crystal of the resin composition is detected in a range of 2θ=16.0° to 16.5°, it is determined that the porous film has the force of generating the β crystal.

Regarding the detail of the β crystalline structure of the polypropylene resin and the wide-angle X-ray diffraction thereof, it is possible to refer to Macromol. Chem. 187, 643-652 (1986), Prog. Polym. Sci. Vol. 16, 361-404 (1991), Macromol. Symp. 89, 499-511 (1995), Macromol. Chem. 75, 134 (1964), and reference documents listed in these documents.

As the polyethylene resin, it is possible to use not only the polyethylene resin such as ultra-low-density polyethylene, low-density polyethylene, linear low-density polyethylene, medium-density polyethylene, high-density polyethylene, and ultra-high-density polyethylene alone, but also a copolymer such as an ethylene-propylene copolymer. Of these polyethylene resins, it is preferable to use the polyethylene resin singly.

Although the melt flow rate (MFR) of the polyethylene resin is not limited to a specific value, it is favorable to set the MFR thereof to 0.03 to 15 g/10 minutes and more favorable to set it to 0.3 to 10 g/10 minutes. By setting the MFR thereof to not less than 0.03 g/10 minutes, it is possible to obtain sufficient melt viscosity of the resin at a molding process time and thus securely obtain sufficient productivity. On the other hand, by setting the MFR thereof to not more than 15 g/10 minutes, the porous polyethylene resin film is allowed to obtain a sufficient mechanical strength.

The method of producing the polyethylene resin is not limited to a specific one, but it is possible to exemplify known polymerization methods in which a known olefin polymerization catalyst is used. The polymerization method in which a multi-site catalyst represented by a Ziegler-Natta type catalyst is used and the polymerization method in which a single-site catalyst represented by a Metallocene catalyst is used are exemplified.

In producing the porous polyolefin resin film, it is favorable to add a compound which accelerates the generation of pores to the polyethylene resin. It is more favorable that the porous polyolefin resin film contains at least one kind of a compound X selected from among modified polyolefin resins, alicyclic saturated hydrocarbon resins or modified substances thereof, ethylene copolymers, and wax. The addition of the compound X to the polyethylene resin allows the porous polyolefin resin film to effectively obtain a porous structure and the configuration and diameter of the micropore thereof to be easily controlled.

In the present invention, the modified polyolefin resin means resins containing polyolefin modified with unsaturated carboxylic acids or anhydrides thereof or with a silane coupling agent as its main component. As the unsaturated carboxylic acids or the anhydrides thereof, it is possible to list acrylic acid, methacrylic acid, maleic acid, maleic anhydride, citraconic acid, citraconic anhydride, itaconic acid, itaconic anhydride; ester compounds of monoepoxy compounds of derivatives of these acids and the acids; and reaction products resulting from polymers having groups reactive with these acids in the molecules thereof and these acids. It is also possible to use metal salts of these substances. Of these unsaturated carboxylic acids and the anhydrides thereof, the maleic anhydride can be used more favorably. Copolymers thereof can be used singly or by mixing not less than two kinds thereof with each other.

As the silane coupling agent, it is possible to list vinyltriethoxysilane, methacryloyloxytrimethoxysilane, and γ-methacryloyloxypropyltriacetyloxysilane.

To produce the modified polyolefin resin, it is possible to copolymerize modified monomers with one another in advance at the step of obtaining a polymer by polymerization or graft-copolymerize the modified monomers with the polymer formed by polymerization. The modified polyolefin resin is formed by using the modified monomers singly or in combination. It is preferable to use the modified polyolefin resin containing not less than 0.1 mass nor more than 5 mass % of the modified monomers. The modified polyolefin resin formed by graft modification is preferably used.

"ADMER" (produced by Mitsui Chemicals, Inc.) and "MODIC" (produced by Mitsubishi Chemical Corporation) are exemplified as the modified polyolefin resin commercially available.

As the alicyclic saturated hydrocarbon resins and the modified substances thereof, petroleum resin, rosin resin, terpene resin, coumarone resin, indene resin, coumarone-indene resin, and modified substances thereof are listed.

In the present invention, the petroleum resin means aliphatic, aromatic, and copolymerization petroleum resins to be obtained by homo-polymerization or copolymerization of one or not less than two kinds of compounds contained in aliphatic olefins and diolefins having C4 to C10 and aromatic compounds having not less than C8 and olefinic unsaturated bonds. The above-described aliphatic olefins and diolefins and aromatic compounds are obtained from side products resulting from thermal decomposition of naphtha.

The petroleum resin includes aliphatic petroleum resin whose main raw material is a C5 fraction, aromatic petroleum resin whose main raw material is a C9 fraction, copolymerized petroleum resins of the aliphatic petroleum resin and the aromatic petroleum resin, and alicyclic petroleum resin. As the terpene resin, it is possible to exemplify terpene resin and terpene-phenol resin to be obtained from β-pinene. As the rosin resin, it is possible to exemplify rosin resin such as gum rosin, wood rosin, and esterified rosin resin modified with glycerin or pentaerythritol.

In the present invention, the ethylene copolymer means compounds obtained by copolymerizing ethylene with not less than one substance selected from among vinyl acetate, unsaturated carboxylic acid, unsaturated carboxylic acid anhydride, and carboxylate.

It is favorable to set the content rate of an ethylene monomer unit in the ethylene copolymer to not less than 50 parts by mass, more favorable to set the content rate thereof to not less than 60 parts by mass, and most favorable to set the content rate thereof to not less than 65 parts by mass. Regarding the upper limit of the content rate of the ethylene monomer unit in the ethylene copolymer, it is favorable to set the content rate thereof to not more than 95 parts by mass, more favorable to set the content rate thereof to not more than 90 parts by mass, and most favorable to set the content rate thereof to not more than 85 parts by mass. When the content rate of the ethylene monomer unit falls within the predetermined range, it is possible to form the porous structure more efficiently.

The ethylene copolymer having the MFR not less than 0.1 g/10 minutes nor more than 10 g/10 minutes is preferably used. By setting the MFR thereof to not less than 0.1 g/10, extrusion processability can be favorably maintained. On the other hand, by setting the MFR thereof to not more than 10 g/10 minutes, the porous polyolefin resin film is allowed to secure a sufficient mechanical strength.

The ethylene copolymers shown below can be commercially available. As ethylene-vinyl acetate copolymers, "EVAFLEX" (produced by Dupont-Mitsui Polychemicals Co., Ltd.) and "Novatec EVA" (produced by Japan Polyethylene Corporation) are exemplified. As ethylene-acrylic acid copolymers, "NUC copolymer" (produced by Nippon Unicar Co., Ltd.), "EVAFLEX-EAA" (produced by Dupont-Mitsui Polychemicals Co., Ltd.), and "REXPEARL EAA" (produced by Japan Ethylene Corporation) are exemplified. As ethylene-(metha) acrylic acid copolymers, "ELVALOY" (produced by Dupont-Mitsui Polychemicals Co., Ltd.) and "REXPEARLE MA" (produced by Japan Ethylene Corporation) are exemplified. As an ethylene-ethyl acrylate copolymer, "REXPEARL EEA" (produced by Japan Ethylene Corporation) is exemplified. As an ethylene-methyl (metha) acrylate copolymer, "ACRYFT" (produced by Sumitomo Chemical Co., Ltd.) is exemplified. As an ethylene-vinyl acetate-maleic anhydride terpolymer, "Bondine" (produced by Sumitomo Chemical Co., Ltd.) is exemplified. As an ethylene-glycidyl methacrylate copolymer, an ethylene-vinyl acetate-glycidylmethacrylateterpolymer, and an ethylene-ethyl acrylate-glycidylmethacrylateterpolymer, "Bondfast" (produced by Sumitomo Chemical Co., Ltd.) are exemplified.

In the present invention, the wax is an organic compound satisfying the following properties (a) and (b).

(a) Melting point is 40° C. to 200° C.

(b) Melt viscosity at temperatures higher than the melting point by 10° C. is not more than 50 Pa·s.

The wax includes polar wax or nonpolar wax, polypropylene wax, polyethylene wax, and wax modifier. More specifically, it is possible to list the polar wax, the nonpolar wax, Fischer-Tropsh wax, oxidized Fischer-Tropsh wax, hydroxystearamide wax, functionalized wax, the polypropylene wax, the polyethylene wax, the wax modifier, amorphous wax, carnauba wax, caster oil wax, microcrystalline wax, beeswax, castor wax, vegetable wax, candelilla wax, Japan wax, ouricury wax, Douglas-fir Bark wax, rice bran wax, jojoba wax, bayberry wax, montan wax, ozokerite wax, ceresin wax, petroleum wax, paraffin wax, chemically modified hydrocarbon wax, substituted amide wax, combinations of these waxes, and derivatives thereof. Of these waxes, the paraffin wax, the polyethylene wax, and the microcrystalline wax are favorable because these waxes allow the porous structure to be formed efficiently. From the standpoint of allowing the SD property to work effectively, the microcrystalline wax is more favorable because it allows the pore diameter to be smaller than the other waxes. As the polyethylene wax commercially available, "FT-115" (produced by Nippon Seiro Co., Ltd.) is exemplified. As the microcrystalline wax commercially available, "Hi-Mic" (produced by Nippon Seiro Co., Ltd.) is exemplified.

In the case where the porous polyolefin resin film is used as the separator for the nonaqueous electrolyte battery, of the above-described compounds X, the alicyclic saturated hydrocarbon resins or the modified substances thereof, the ethylene copolymers, and the wax are favorable because these compounds allow the SD property to work more effectively. From the standpoint of moldability, the wax is more favorable.

In forming micropores by peeling the interface between the polyethylene resin and the compound X, as the lower limit of the mixing amount of the compound X for 100 parts by mass of the polyethylene resin, it is favorable to set the mixing amount thereof to not less than one part by mass, more favorable to set it to not less than five parts by mass, and most favorable to set it to not less than 10 parts by mass. On the other hand, as the upper limit of the mixing amount thereof, it is favorable to set the mixing amount thereof to not more than 50 parts by mass, more favorable to set it to not more than 40 parts by mass, and most favorable to set it to not more than 30 parts by mass. By setting the mixing amount of the compound X for 100 parts by mass of the polyethylene resin to not less than one part by mass, it is possible to obtain a sufficient effect of developing an intended favorable porous structure. By setting the mixing amount of the compound X for 100 parts by mass of the polyethylene resin to not more than 50 parts by mass, it is possible to secure a more stable moldability.

In addition to the polyethylene resin and the compound X which accelerates the generation of pores, the porous polyolefin resin film may contain additives or other components to be normally contained in a resin composition. The additives are contained in the resin composition to improve and adjust molding processability, productivity, and various properties of the porous film. As the additives, it is possible to list recycle resin generated from trimming loss such as a lug, inorganic particles such as silica, talc, kaolin, calcium carbonate, and the like, pigments such as titanium oxide, carbon black, and the like, a flame retardant, a weathering stabilizer, a heat stabilizer, an antistatic agent, a melt viscosity improving agent, a crosslinking agent, a lubricant, a nucleating agent, a plasticizer, an age resistor, an antioxidant, a light stabilizer, an ultraviolet ray absorber, a neutralizing agent, an antifog agent, an anti-blocking agent, a slip agent, and a coloring agent.

Of the above-described additives, the nucleating agent is preferable because it has the effect of controlling the crystalline structure of the polyethylene resin and forming a fine porous structure when the unporous membrane material is stretched to form pores therethrough. As examples of the nucleating agent commercially available, "Gelall D" (produced by New Japan Science Ltd.), "ADEKA STAB" (produced by Asahi Denka Co., Ltd.), "Hyperform" (produced by Milliken & Company), and "IRGACLEAR D" (produced by Chiba Specialty Chemicals, Inc.) are listed. As an example of the polyethylene resin to which the nucleating agent has been added, "Rikemaster" (produced by Riken Vitamin Co., Ltd.) is commercially available.

[Description of Structure of Porous Film]

It is favorable that the structure of the porous polyolefin resin film of the present invention has a layer (hereinafter referred to "layer I") consisting of the resin composition containing the polypropylene resin as its main component. The porous polyolefin resin film may be composed of a single layer or a plurality of layers laminated one upon another. In the case where the porous polyolefin resin film has a plurality of layers laminated one upon another, it is more favorable to laminate the layer I and a layer (hereinafter referred to "layer II") containing the polyethylene resin as its main component one upon another. A layer having a function different from those of the layers I and II may be laminated on the layer I or the layer II in a range in which the layer having the function different from those of the layers I and II does not prevent the porous polyolefin resin film of the present invention from displaying its function. Specifically, as the layer having the function different from those of the layers I and II, a strength-retaining layer and a heat resistant layer are exemplified.

Regarding the lamination structure, it is possible to exemplify a two-layer structure composed of the layer I/the layer II laminated one upon another and a three-layer structure composed of the layer I/the layer II/the layer I laminated one upon another or a three-layer structure composed of the layer II/the layer I/the layer II laminated one upon another. It is also possible to form a three-kind three-layer mode composed of the layers I and II and one more layer, having other functions, which is combined with the layer I or the layer II. In this structure, the lamination order among the layers I and II and one more layer does not matter. It is also possible to increase the number of layers to four layers, five layers, six layers or seven layers as necessary. In the case where the porous polyolefin resin film has not less than two layers I, the contents of components of the layers I may be equal to or different from each other.

Of the above-described lamination structures, the two-kind three-layer structure composed of the layer I/the layer II/the layer I laminated one upon another is preferable because the degree of curling and surface smoothness of the obtained porous polyolefin resin film are favorable.

It is possible to freely adjust the properties of the porous polyolefin resin film of the present invention such as an average flow rate diameter pressure ($P_{AP}$), a bubble point pressure ($P_{BP}$), an air permeability (Pa), and an electric resistance according to a lamination structure, a ratio among the thicknesses of layers laminated one upon another, the composition of each layer, and a production method.

It is important that the average flow rate diameter pressure ($P_{AP}$) of the porous polyolefin resin film is set to 1500 to 2500 kPa and preferable that the average flow rate diameter pressure ($P_{AP}$) thereof is set to 1600 to 2200 kPa.

By setting the average flow rate diameter pressure ($P_{AP}$) thereof to not less than 1500 kPa, in the case where the porous polyolefin resin film is used as the separator for the nonaqueous electrolyte battery, the battery is capable of securing its liquid-retaining property to a high extent in injecting an electrolytic solution into the battery in assembling it. Further it is possible to prevent lithium dendrite from depositing. Thus it is possible to prevent a dendrite-caused short circuit from occurring between the positive and negative electrodes.

On the other hand, by setting the average flow rate diameter pressure ($P_{AP}$) thereof to not more than 2500 kPa, in the case where the porous polyolefin resin film is used as the separator for the nonaqueous electrolyte battery, the electrolytic solution is capable of sufficiently permeating into the porous polyolefin resin film. Further the porous polyolefin resin film is restrained from clogging in repeated charge and discharge and thus the battery is capable of securing a cycle characteristic to a sufficient extent.

It is important that the bubble point pressure ($P_{BP}$) thereof is set to 300 to 1500 kPa. It is favorable to set the bubble point pressure ($P_{BP}$) thereof to 500 to 1200 kPa and more favorable to set it to 700 to 1000 kPa.

By setting the bubble point pressure ($P_{BP}$) thereof to not less than 300 kPa, even though the lithium dendrite is deposited in the case where the porous polyolefin resin film is used as the separator for the nonaqueous electrolyte battery, it is possible to restrain the risk of the occurrence of the short-circuit and a nonuniform generation of reaction of the battery, which is preferable.

On the other hand, by setting the bubble point pressure ($P_{BP}$) thereof to not more than 1500 kPa, the wettability of the electrolytic solution can be sufficiently retained. Therefore in using the porous polyolefin resin film as the separator for the nonaqueous electrolyte battery, the separator is restrained from clogging, and the battery is capable of securing the cycle characteristic to a sufficient extent.

To allow the bubble point pressure ($P_{BP}$) thereof to satisfy the specified range, it is favorable that of the polyolefin resin to be used for the porous polyolefin resin film, the porous polyolefin resin film contains not less than 30 mass % of the polypropylene resin and more favorable that the polypropylene resin has the β crystal activity.

It is favorable to set the air permeability (Pa) thereof to 5 to 2000 seconds/100 ml and more favorable to set it to 10 to 1000 seconds/100 ml.

By setting the air permeability (Pa) thereof to not more than 2000 seconds/100 ml, irrespective of values of the average flow rate diameter pressure ($P_{AP}$) thereof, the battery is capable of securing a sufficient output, which is preferable. On the other hand, by setting the air permeability (Pa) thereof to not less than five seconds/100 ml, the porous polyolefin resin film securely obtains a sufficient mechanical strength. In addition when the porous polyolefin resin film is used as the separator for the nonaqueous electrolyte battery, it is possible to decrease the risk of the short circuit which occurs owing to the deposition of the lithium dendrite, which is preferable.

The electric resistance of the separator, for the nonaqueous electrolyte battery, impregnated with the electrolytic solution is often evaluated by proportioning the electric resistance thereof to the air permeability thereof. But this way of evaluating the electric resistance is inaccurate. For example, when one pinhole having a diameter of about 0.5 mm is formed through an unporous film having a porosity of 0%, the air permeability thereof is less than 500 seconds/100 ml. But the electric resistance thereof is several times higher than that of a microporous film having an air permeability equal to that of the above-described unporous film and a porosity of 50%. A method of estimating the electric resistance of the separator for the nonaqueous electrolyte battery from the thickness and porosity thereof is known. But when the separator has independent bubbles not intercommunicating with one another, the electrolytic solution does not penetrate thereinto. Thus the separator has a high electric resistance.

That is, the shorter is the average of the lengths of all intercommunicable pores in the thickness direction of the separator for the nonaqueous electrolyte battery or the larger is the sum of the sectional areas of all the intercommunicable pores of the separator for the nonaqueous electrolyte battery, the lower is the internal resistance of the battery. But in the case where intercommunicable pores short in the thickness direction of the separator for the nonaqueous electrolyte battery and having large diameters are locally formed in the separator, the separator has a very low air permeability. Because the air permeability in this case is not a numerical value reflecting the lengths and diameters of all the intercommunicable pores, it is impossible to make the actual internal resistance of the battery low. Therefore it can be said that it is necessary to improve the ratio of the air permeability of the porous polyolefin resin film to the bubble point pressure thereof to evaluate the maximum pore diameter.

To this end, in the present invention, it has been found that to decrease the electric resistance of the porous polyolefin resin film in the case where the porous polyolefin resin film is used as the separator for the nonaqueous electrolyte battery, it is necessary to set the ratio of the air permeability (Pa) thereof to the bubble point pressure ($P_{BP}$) thereof to not more than a certain value.

It is important that the ratio of the air permeability (Pa) of the porous olefin resin film of the present invention to the bubble point pressure ($P_{BP}$) thereof is not more than 0.35 seconds/(100 ml·kPa). It is preferable that the ratio of (Pa/$P_{BP}$) is not more than 0.32 seconds/(100 ml·kPa).

By setting the ratio of Pa/$P_{BP}$ to not more than 0.35 seconds/(100 ml·kPa), in the case where the porous polyolefin resin film is used as the separator for the nonaqueous electrolyte battery, the battery is allowed to have a sufficiently low internal resistance and a high output. Although the lower limit of the ratio of Pa/$P_{BP}$ is not limited to a specific value, it is preferable to set the ratio of Pa/$P_{BP}$ to not less than 0.03 seconds/(100 ml·kPa) in consideration of the balance among the properties of the porous polyolefin resin film.

To allow the ratio of Pa/$P_{BP}$ to satisfy the specified range, it is preferable to adjust the melt flow rate (MFR) of the polyolefin resin to be used for the porous film to 0.1 to 15 g/10 minutes. By adjusting the MFR thereof to the above-described range, the porous polyolefin resin film has improved ventilation and a low value in its air permeability. Thereby the ratio of Pa/$P_{BP}$ has a small value and is allowed to satisfy the specified range, which is preferable.

It is favorable to set the ratio (Pa/$P_{AP}$), namely, the ratio of the air permeability (Pa) of the porous polyolefin resin film of the present invention to the average flow rate diameter pressure ($P_{AP}$) thereof to not more than 0.18 seconds/(100 ml·kPa) and more favorable to set the ratio of Pa/$P_{AP}$ to not more than 0.15 seconds/(100 ml·kPa). By setting the ratio of Pa/$P_{AP}$ to not more than 0-0.18 seconds/(100 ml·kPa), in the case where the porous polyolefin resin film is used as the separator for the nonaqueous electrolyte battery, the battery is allowed to have a sufficiently low internal resistance and a high output. The lower limit of the ratio of Pa/$P_{AP}$ is not limited to a specific value, but it is preferable to set the ratio of Pa/$P_{AP}$ to not less than 0.03 seconds/(100 ml·kPa) in consideration of the balance among the properties of the porous polyolefin resin film.

It is favorable to set the electric resistance of the porous polyolefin resin film of the present invention to not more than 0.85Ω and more favorable to set the electric resistance thereof to 0.80Ω. By setting the electric resistance thereof to not more than 0.85Ω, in the case where the porous polyolefin resin film is used as the separator for the nonaqueous electrolyte battery, an electric charge moves easily and thus the battery has excellent performance, which is preferable.

On the other hand, although the lower limit of the electric resistance thereof is not limited to a specific value, it is favorable to set the electric resistance thereof to not less than 0.10Ω, more favorable to set it to not less than 0.15Ω, and most favorable to set it to not less than 0.20Ω. By setting the electric resistance thereof to not less than 0.10Ω, in the case where the porous polyolefin resin film is used as the separator for the nonaqueous electrolyte battery, it is possible to sufficiently avoid the occurrence of a trouble such as an internal short circuit.

Regarding the lower limit of the porosity of the porous polyolefin resin film of the present invention, it is favorable to set the porosity thereof to not less than 20% and more favorable to set it to not less than 30%. By setting the porosity thereof to not less than 20%, the pores of the porous polyolefin resin film are allowed to be sufficiently intercommunicable. In addition, in the case where the porous polyolefin resin film is used as the separator for the nonaqueous electrolyte battery, the battery is capable of securely retaining a sufficient amount of an electrolyte replenisher therein and obtaining a sufficient output.

Regarding the upper limit of the porosity thereof, it is preferable to set the porosity thereof to not more than 80%. By setting the porosity thereof to not more than 80%, the porous polyolefin resin film is allowed to secure a sufficient mechanical strength. Thus in the case where the porous polyolefin resin film is used as the separator for the nonaqueous electrolyte battery, it is possible to restrain the risk of an internal short circuit from occurring in the nonaqueous electrolyte battery owing to deformation of the separator caused by a tensile force generated when the separator is wound to accommodate it in a cylindrical battery can, owing to the formation of holes through the separator caused by rough surfaces of electrodes disposed adjacently to the separator or owing to breakage of the film of the separator caused by the deposition of the lithium dendrite.

Regarding the lower limit of the thickness of the porous polyolefin resin film of the present invention, it is favorable to set the thickness thereof to not less than 3 μm and more favorable to set it to not less than 5 μm. By setting the thickness thereof to not less than 3 μm, the porous polyolefin resin film is capable of having a sufficient strength. Therefore in the case where the porous polyolefin resin film is used as the separator for the nonaqueous electrolyte battery, it is possible to restrain the risk of the internal short circuit from occurring in the nonaqueous electrolyte battery.

Regarding the upper limit of the thickness of the porous polyolefin resin film, it is favorable to set the thickness thereof to not more than 100 μm, more favorable to set the thickness thereof to not more than 80 μm, and most favorable to set the thickness thereof to not more than 60 μm. By setting the thickness thereof to not more than 100 μm, in the case where the porous polyolefin resin film is used as the separator for the nonaqueous electrolyte battery, it is possible to restrain the output of the battery from lowering owing to an inappropriate distance between electrodes and the capacitance of the battery from decreasing owing to a relative decrease of volumes occupied by the electrodes.

(Production Method)

The method for producing the porous polyolefin resin film of the present invention is described below. But it is to be noted that the present invention is not limited to the porous polyolefin resin film to be produced by the production method described below.

As the method for producing the porous polyolefin resin film, it is possible to use known methods such as a stretching method, an extraction method, a chemical treatment method, a foaming method, and methods to be carried out in combination of these methods. In the present invention, it is preferable to use the extraction method.

As the stretching method, a method of forming an unporous membrane material by using a composition consisting of a mixture of a resin component and an immiscible component and peeling the interface between the resin component and the immiscible component by stretching the unporous membrane material to form pores and a method of adding a specific crystal nucleating agent to a resin composition to form the unporous membrane material in such a way that spherocrystals are formed and stretching the unporous membrane material to form pores.

In the extraction method, after an additive removable at a subsequent process is added to a resin composition to form an unporous membrane material, the additive is extracted with chemicals to form pores. As the additive, a polymeric additive, an organic additive, and an inorganic additive are listed.

In the chemical treatment method, the bond of a polymeric substrate is chemically cut off and reversely, a bond reaction is carried out to form micropores. More specifically a method of forming micropores by carrying out chemical treatment such as oxidation-reduction treatment, alkaline treatment, and acid treatment is exemplified.

In the present invention, in the case where the porous polyolefin resin film is composed of a plurality of layers laminated one upon another, the method of producing the porous polyolefin resin film is classified into the following four according to the order between porousness and lamination.

(I) A method of making respective layers porous and thereafter laminating the layers which have been made porous one upon another or bonding them to each other by using an adhesive agent or the like.

(II) A method of forming a laminated unporous membrane material by laminating respective layers one upon another and thereafter making the unporous membrane material porous.

(III) A method of making any one of layers porous, laminating the layer which has been made porous and the other layer one upon another, and making the other layer porous.

(IV) A method of forming porous layers and thereafter laminating the formed porous layers one upon another by applying inorganic or organic particles thereto or by evaporating metal particles thereto to form a laminated porous film.

In the present invention, it is preferable to use the method (II) from the standpoint of the simplicity of its process and productivity. To secure the adhesion between two layers, it is especially preferable to form the laminated unporous membrane material by co-extrusion and thereafter make it porous.

The method of producing the unporous membrane material is not limited to a specific method, but known methods may be used. It is possible to exemplify a method of melting a resin composition by using an extruder, extruding it from a T-die, and cooling it with a casting roll to solidify it. It is also possible to use a method of cutting open a film produced by using a tubular method to make it planar.

The method of stretching the unporous membrane material includes a roll stretching method, a rolling method, a tenter stretching method, and a simultaneous biaxial stretching method. It is preferable to stretch the unporous membrane material in at least a uniaxial direction by using one of the above-described methods or not less than two of the above-described methods in combination. From the standpoint of the control of the porous structure, the biaxial stretching is more favorable than the other stretching methods.

Description is made on a method of producing a laminated porous film including the step of producing a laminated unporous membrane material having the two-kind three-layer structure composed of upper and lower layers each consisting of a resin composition containing the polypropylene resin having the β crystal activity as its main component and an intermediate layer consisting of a resin composition containing the polyethylene resin and the compound X by co-extruding the resin compositions from a T-die and the step of biaxially stretching the laminated unporous membrane material to make it porous.

It is preferable that the resin composition composing the surface layer and that composing the back surface layer contain at least the polypropylene resin and the β nucleating agent. These materials are mixed with one another by using a mixer. It is preferable to use a Henschel mixer, a super mixer or a tumbler-type mixer. Alternatively all the components are put in a bag and mixed with one another by hand. Thereafter the mixture is melted and kneaded by using a uniaxial extruder, a twin screw extruder or a kneader. It is preferable to use the twin screw extruder. Thereafter the mixture is pelletized.

The polyethylene resin, the compound X, and additives of the resin composition composing the intermediate layer are mixed with one another by using the Henschel mixer, the super mixer or the tumbler-type mixer. The additives are added to the polyethylene resin as necessary. Thereafter the mixture is melted and kneaded by using the uniaxial extruder, the twin screw extruder or the kneader. It is preferable to use the twin extruder. Thereafter the mixture is pelletized.

The pellet consisting of the resin composition composing the surface layer and back surface layer of the laminated unporous membrane material and the pellet consisting of the resin composition composing the intermediate layer are supplied to separate extruders and extruded from a co-extrusion mouthpiece of the T-die of each extruder. As the kind of the T-die, it is possible to use a multi-manifold type for forming the two-kind three-layer structure and a feed block type for forming the two-kind three-layer structure.

Although the gap in the T-die to be used is determined according to an ultimately necessary thickness of the film, a stretching condition, a draft ratio, and various conditions, the gap in the T-die is set to normally 0.1 to 3.0 mm and favorably 0.5 to 1.0 mm. From the standpoint of a production speed, it is unpreferable to set the gap in the T-die to less than 0.1 mm. In the case where the gap in the T-die is set to more than 3.0 mm, the draft ratio becomes large. Thus it is unpreferable to set the gap in the T-die to more than 3.0 mm from the standpoint of stability in the production of the porous polyolefin resin film.

Although the extrusion processing temperature in the extrusion molding is appropriately adjusted according to the flow property of the resin composition and the moldability thereof, it is favorable to set the extrusion processing temperature to 150 to 300° C. and more favorable to set it to 180 to 280° C. In the case where the extrusion processing temperature is not less than 150° C., the fused resin has a sufficiently low viscosity and thus an excellent moldability, which is preferable. On the other hand, in the case where the extrusion processing temperature is not more than 300° C., it is possible to restrain the resin composition from deteriorating.

The cooling/solidifying temperature at which the resin composition is cooled to solidify it by using the casting roll is very important in the present invention. It is possible to generate and grow the β crystal contained in the membrane material before it is stretched and adjust the ratio of the β crystal contained in the membrane material by cooling the resin composition at a preferable cooling/solidifying temperature. It is favorable to set the cooling/solidifying temperature at which the resin composition is cooled to solidify it by using the casting roll to 80 to 150° C., more favorable to set it to 90 to 140° C., and most favorable to set it to 100 to 130° C. By setting the cooling/solidifying temperature to not less than 80° C., it is possible to sufficiently increase the ratio of the β crystal contained in the membrane material solidified by cooling it, which is preferable. By setting the cooling/solidifying temperature to not more than 150° C., a trouble that extruded molten resin adheres to the casting roll and winds around it is unlikely to occur, and thus it is possible to efficiently process the resin composition into the membrane material, which is preferable.

By setting the temperature of the casting roll to the above-described temperature range, the ratio of the β crystal of the unstretched membrane material is set to 30 to 100%. It is favorable to set the ratio thereof to 40 to 100%, more favorable to set the ratio thereof to 50 to 100%, and most favorable to set the ratio thereof to 60 to 100%. By setting the ratio of the β crystal of the unstretched membrane material to not less than 30%, it is easy to make the unstretched membrane material porous by a stretching operation to be performed at a later step. Thereby it is possible to obtain the porous polyolefin resin film having an excellent air-permeable characteristic.

By using the differential scanning calorimeter, the ratio of the β crystal of the unstretched membrane material is computed based on the following equation by using the detected crystal melting heat amount ($\Delta Hm\alpha$) derived from the α crystal of the polypropylene resin and the detected crystal melting heat amount ($\Delta Hm\beta$) derived from the β crystal thereof, when the temperature of the unstretched membrane material is raised from 25° C. to 240° C. at a heating speed of 10° C./minute.

$$\text{Ratio (\%) of β crystal} = [\Delta Hm\beta/(\Delta Hm\beta + \Delta Hm\alpha)] \times 100$$

Thereafter the obtained unporous membrane material may be uniaxially or biaxially stretched in the length direction thereof or in the width direction thereof. In the case where the unporous membrane material is biaxially stretched, it is possible to use simultaneous biaxial stretching or sequential biaxial stretching. In producing the porous polyolefin resin film of the present invention, the sequential biaxial stretching is more favorable than the simultaneous biaxial stretching because the sequential biaxial stretching allows a stretching condition to be selected at each stretching step and the porous structure to be easily controlled. It is to be noted that stretching in a pick-up (flow) direction (MD) in which the membrane material is picked up is called "stretching in a length direction", whereas stretching in a direction (TD) vertical to the MD is called "stretching in a width direction".

In the case where the sequential biaxial stretching is used, it is favorable to set the stretching ratio in the length-direction stretching to favorably 2 to 10 times and more favorable to set it to 3 to 8 times longer than the original length of the unporous membrane material. By stretching the unporous membrane material in the length direction in the above-described specified range of the stretching ratio, it is possible to moderately generate the starting point in the generation of pores. By stretching the unporous membrane material in the length direction at not more than 10 times longer than the original length thereof, it is possible to moderately develop the starting point in the generation of the pores.

It is necessary to select the stretching temperature according to the composition, crystalline melting peak temperature, and crystallization degree of the resin composition to be used. The stretching temperature in the length-direction stretching is controlled in the range of 20 to 160° C. and favorably 30 to 150° C. By stretching the unporous membrane material in the length direction within the above-described temperature range, it is possible to easily control the porous structure and easily take a balance among various properties of the porous polyolefin resin film such as its mechanical strength and contraction percentage.

When the stretching temperature falls below 20° C., a stretching-caused stress becomes very high. Thus stretching-caused breakage is liable to occur. In the case where the unstretched membrane material is stretched by using a roll, there occur problems that a high load is applied to equipment and that the unstretched membrane material is liable to be nonuniformly stretched because adhesion between the roll and the unstretched membrane material becomes low. On the other hand, when the stretching temperature exceeds 160° C., the unstretched membrane material is liable to adhere to the roll and thus it is difficult to stably stretch it.

It is favorable to set the stretching ratio in the width direction to favorably 2.0 to 10 times and more favorable to set it to 2.2 to 7 times longer than the original length of the unporous membrane material. By stretching the unporous membrane material in the width direction in the above-described range of the stretching ratio, it is possible to moderately enlarge the starting point in the generation of pores formed by stretching it in the length direction, develop a microporous structure, and easily take a balance among various properties of the porous polyolefin resin film.

The stretching temperature in the width-direction stretching is set to 50 to 130° C. By stretching the unporous membrane material in the width direction in the above-described range of the stretching temperature, it is possible to moderately enlarge the starting point in the generation of the pores formed by stretching it in the length direction and develop the microporous structure. It is favorable to set the stretching speed at the above-described stretching steps to 50 to 1200%/minute, more favorable to set it to 150 to 1000%/minute, and most favorable to set it to 250 to 900%/minute.

It is possible to obtain the porous polyolefin resin film having the average flow rate diameter pressure, the bubble point pressure, and the air permeability satisfying the range specified by the present invention by adjusting the stretching temperature and the stretching ratio. It is preferable to set the stretching temperature in the length-direction stretching to not less than 70° C. or the stretching ratio in the width-direction stretching to not less than 2.2 times longer than the original length of the unporous membrane material.

In the case where the stretching temperature in the length-direction stretching is set to less than 70° C., the unporous membrane material greatly fibrillates when it is crazed in the length-direction stretching. Thereby micropores are formed. Because the micropores can be easily closed at a high temperature, the separator is allowed to have the SD property, which is advantageous. To obtain a battery having a high output, it is unpreferable to set the stretching temperature in the length-direction stretching to less than 70° C.

Therefore in the case where the stretching temperature in the length-direction stretching is set to 20 to 70° C., the stretching ratio in the width-direction stretching is set to not less than 2.2 times longer than the original length of the unporous membrane material to widely open crazes generated in the length-direction stretching. Thereby a battery having a high output can be achieved.

To improve the dimensional stability of the porous polyolefin resin film obtained in the above-described manner, the unporous membrane material is thermally treated at favorably 100 to 140° C. and more favorably 110 to 135° C. As necessary the unporous membrane material may be thermally relaxed by 1 to 25%. The porous polyolefin resin film of the present invention is obtained by uniformly cooling the unporous membrane material of ter it is thermally treated and thereafter winding it around a winder.

(Description of Separator for Battery)

A nonaqueous electrolytic solution battery accommodating the porous polyolefin resin film of the present invention as the separator therefor is described below with reference to FIG. 1.

Both a positive electrode plate 21 and a negative electrode plate 22 are spirally wound in such a way that the positive electrode plate 21 and the negative electrode plate 22 are overlapped each other via a separator 10 for the battery to obtain a body consisting of both electrode plates 21 and 22 and the separator 10. The outer side of the body is fixed with a tape. In spirally winding the positive electrode plate 21 and the negative electrode plate 22 via the separator 10, it is favorable to set the thickness of the separator 10 for the battery to 3 to 100 µm and more favorable to set it to 5 to 80 µm. By setting the thickness of the separator 10 for the battery to not less than 3 µm, the separator 10 for the battery is unlikely to break. By setting the thickness of the separator 10 for the battery to not more than 100 µm, in accommodating the positive electrode plate 21, the negative electrode plate 22, and the separator 10 in a predetermined battery can by winding them, it is possible to make the area of the battery large and thus increase the capacitance of the battery.

The body composed of the positive electrode plate 21, the separator 10 for the battery, and the negative electrode plate 22 integrally wound is accommodated inside a bottomed cylindrical battery case and welded to a positive lead 24 and a negative lead 25. Thereafter an electrolyte is injected into the battery can. After the electrolyte penetrates into the separator 10 sufficiently, the periphery of the opening of the battery can is sealed with a positive lid 27 via a gasket 26. Thereafter preparatory charge and aging are carried out to produce a cylindrical nonaqueous electrolytic solution battery.

An electrolytic solution composed of an organic solvent in which a lithium salt is dissolved is used as the electrolytic solution of the battery. Although the organic solvent is not limited to a specific kind, esters such as propylene carbonate, ethylene carbonate, butylene carbonate, γ-butyrolactone, γ-valerolactone, dimethyl carbonate, methyl propionate, and butyl acetate; nitriles such as acetonitrile; ethers such as 1,2-dimethoxyethane, 1,2-dimethoxymethane, dimethoxypropane, 1,3-dioxolane, tetrahydrofuran, 2-methyltetrahydrofuran, and 4-methyl-1,3-dioxofuran; and sulfolane are listed. These substances can be used singly or in combination of not less than two kinds thereof. Above all, an electrolyte in which 1.0 mol/L of lithium phosphate hexafluoride ($LiPF_6$) is dissolved in a solvent consisting of two parts by mass of methyl ethyl carbonate is mixed with one part by mass of ethylene carbonate is preferable.

As the negative electrode, an alkali metal or an alkali metal-containing compound integrated with a current collector such as a net made of stainless steel is used. As the alkali metal, lithium, sodium, and potassium are listed. As the compound containing the alkali metal, alloys of the alkali metal and aluminum, lead, indium, potassium, cadmium, tin or magnesium; compounds of the alkali metals and a carbon material; and compounds of the alkali metal having a low electric potential and metal oxides or sulfides are listed.

In the case where the carbon material is used for the negative electrode, it is possible to use those capable of doping or de-doping lithium ions. For example, it is possible to use graphite, pyrolytically decomposed carbons, cokes, glassy carbons, calcined organic polymeric compounds, mesocarbon microbeads, carbon fibers, and activated carbon.

A negative electrode plate produced as follows is used as the negative electrode in this embodiment. A carbon material having an average particle diameter of 10 µm is mixed with a solution in which vinylidene fluoride is dissolved in N-methylpyrrolidone to obtain a slurry. After the slurry, consisting of the mixture of the above-described substances, which forms the negative electrode is passed through a 70-mesh net to remove large particles, the slurry is uniformly applied to both surfaces of a negative current collector consisting of a belt-shaped copper foil having a thickness of 18 μm and is dried. After the slurry is compression-molded by a roll press machine, the molded body is cut to obtain the belt-shaped negative electrode plate.

A molded body produced as follows is used as the negative electrode. A metal oxide such as lithium cobalt oxide, lithium nickel oxide, lithium manganese oxide, manganese dioxide, vanadium pentoxide or chromium oxide and a metal sulfide such as molybdenum disulfide are used as the active substance of the positive electrode. A conductive assistant and a binding agent such as polytetrafluoroethylene are appropriately added to the positive active substance to obtain a combination of these substances. Thereafter the combination of these substances is processed into the molded body by using a current-collecting material such as stainless steel net as the core of the positive electrode.

In this embodiment, as the positive electrode, a belt-shaped positive electrode plate produced as described below is used. That is, as a conductive assistant, scaly graphite is added to the lithium cobalt oxide ($LiCoO_2$) at a mass ratio of the lithium cobalt oxide:the scaly graphite=90:5. The mixture of these two substances and a solution in which the polyvinylidene fluoride is dissolved in the N-methylpyrrolidone are mixed with each other to obtain a slurry. After the slurry, consisting of the mixture of these substances, which forms the positive electrode is passed through the 70-mesh net to remove large particles, the slurry is uniformly applied to both surfaces of a positive current collector consisting of an aluminum foil having a thickness of 20 μm and dried. After the slurry is compression-molded with the roll press machine, the molded body is cut to obtain the belt-shaped positive electrode plate.

EXAMPLES

Example 1

0.2 parts by mass of a β crystal nucleating agent consisting of 3,9-bis[4-(N-cyclohexylcarbamoyl)phenyl]-2,4,8,10-[5.5]undecane and 0.2 parts by mass of an antioxidant (IRGANOX-B225 produced by Chiba Specialty Chemicals K.K.) were added to 100 parts by mass of polypropylene resin (Prime Polypro "F300SV" produced by Prime Polymer Co., Ltd., MFR: 3 g/10 minutes). The mixture of the above-described components was melted and kneaded at a temperature of 270° C. by using a co-rotation twin screw extruder (produced by Toshiba Machine Co., Ltd., bore: ϕ40 mm, effective length of screw L/D: 32) to obtain a pellet-shaped resin composition P1.

After the resin composition P1 was extruded at 200° C. from a T-die of a uniaxial screw extruder, the resin composition P1 was cooled for 15 seconds on a casting roll having a temperature of 125° C. to solidify it. Thereafter the resin composition P1 was wound around a winder to obtain an unporous membrane material S1.

After the unporous membrane material S1 was stretched 7.0 times longer than its original length at 120° C. in the MD, the unporous membrane material S1 was sequentially biaxially stretched 6.6 times longer than its original length at 120° C. in the TD. Thereafter the unporous membrane material S1 was thermally relaxed by 14% at 115° C. in the TD to obtain a porous film.

Example 2

After the unporous membrane material S1 produced in the example 1 was stretched 5.0 times longer than its original length at 120° C. in the MD, the unporous membrane material S1 was sequentially biaxially stretched 5.0 times longer than its original length at 120° C. in the TD. Thereafter the unporous membrane material S1 was thermally relaxed by 14% at 115° C. in the TD to obtain a porous film.

Example 3

10 parts by mass of microcrystalline wax ("HiMic-1090" produced by Nippon Seiro Co., Ltd.) was added to 90 parts by mass of high-density polyethylene ("HiZex-3300F produced by Prime Polymer Co., Ltd., MFR: 1.1 g/10 minutes). Thereafter the mixture of the above-described components was melted and kneaded at a temperature of 200° C. by using the co-rotation twin screw extruder (produced by Toshiba Machine Co., Ltd., bore: ϕ35 mm, effective length of screw L/D: 32) to obtain a pellet-shaped resin composition E1.

After the resin compositions P1 and E1 were extruded at 200° C. from multi-layer molding T-dies of different extruders through a feed block for forming a film having a two-kind three-layer structure, the resin compositions P1 and E1 were laminated one upon another in such a way that the thickness ratio P1/E1/P1 among two layers of the resin compositions P1 and one layer of the resin composition E1 was 3/1/3. Thereafter the laminated resin compositions P1 and E1 were dropped to a casting roll having a temperature of 130° C. and cooled for 15 seconds. Thereafter they were wound around a winder to obtain a laminated unporous membrane material S2.

After the unporous membrane material S2 was stretched 2.5 times longer than its original length at 50° C. in the MD and further stretched 3.8 times longer than its original length at 120° C. in the MD, the unporous membrane material S2 was sequentially biaxially stretched 2.3 times longer than its original length at 100° C. in the TD. Thereafter the unporous membrane material S2 was thermally fixed at 125° C. and thermally relaxed by 17% at 115° C. in the TD to obtain a porous film.

Example 4

After the resin compositions P1 and E1 were extruded at 200° C. from the multi-layer molding T-dies of different extruders through the feed block for forming a film having the two-kind three-layer structure, the resin compositions P1 and E1 were laminated one upon another in such a way that the thickness ratio P1/E1/P1 among two layers of the resin compositions P1 and one layer of the resin composition E1 was =3/1/3. Thereafter the laminated resin compositions P1 and E1 were dropped to the casting roll having a temperature of 130° C. and cooled for 15 seconds. Thereafter they were wound around the winder to obtain a laminated unporous membrane material S3.

After the unporous membrane material S3 was stretched 3.6 times longer than its original length at 98° C. in the MD, the unporous membrane material S3 was sequentially biaxially stretched 2.4 times longer than its original length at 109° C. in the TD. Thereafter the unporous membrane material S3 was thermally fixed at 125° C. and thermally relaxed by 12% at 125° C. in the TD to obtain a porous film.

Example 5

0.1 part by mass of a β crystal nucleating agent consisting of 3,9-bis[4-(N-cyclohexylcarbamoyl)phenyl]-2,4,8,10-[5.5]undecane and 0.2 parts by mass of an antioxidant (IRGASTAB FS-301 produced by Chiba Specialty Chemicals K.K.) were added to 100 parts by mass of polypropylene resin ("Novatec PP SA4L" produced by Nippon Polypropylene Corporation, MFR: 5 g/10 minutes). The mixture of the above-described components was melted and kneaded at a temperature of 270° C. by using the co-rotation twin screw extruder (produced by Toshiba Machine Co., Ltd., bore: φ40 mm, effective length of screw L/D: 32) to obtain a pellet-shaped resin composition P2. Three parts by mass of polypropylene wax ("Viscol 330P produced by Sanyo Chemical Industries, Ltd.) was added to 97 parts by mass of high-density polyethylene ("HiZex-3600F produced by Prime Polymer Co., Ltd., MFR: 1 g/10 minutes). Thereafter the mixture of the above-described components was melted and kneaded at a temperature of 220° C. by using the co-rotation twin screw extruder (produced by Toshiba Machine Co., Ltd., bore: φ35 mm, effective length of screw L/D: 32) to obtain a pellet-shaped resin composition E2. After the resin compositions P2 and E2 were extruded at 200° C. from multi-manifold type T-dies of different extruders for forming a film having the two-kind three-layer structure, the resin compositions P2 and E2 were laminated one upon another in such a way that the thickness ratio P2/E2/P2 among two layers of the resin compositions P2 and one layer of the resin composition E2 was 1/1/1. After the laminated resin compositions P2 and E2 were dropped to the casting roll whose temperature was set to 123° C., they were cooled for 15 seconds. Thereafter the laminated resin compositions P2 and E2 were wound around the winder to obtain a laminated unporous membrane material S4. After the unporous membrane material S4 was stretched 4.0 times longer than its original length at 115° C. in the MD, it was sequentially biaxially stretched 2.0 times longer than its original length at 100° C. in the TD. After the unporous membrane material S4 was thermally fixed at 135° C., it was thermally relaxed by 5% at 105° C. in the TD to obtain a porous film.

Comparison Example 1

After the unporous membrane material S1 produced in the example 1 was stretched 1.7 times longer than its original length at 40° C. in the MD and further stretched 2.7 times longer than its original length at 120° C. in the MD, the unporous membrane material S1 was sequentially biaxially stretched 1.9 times longer than its original length at 98° C. in the TD. Thereafter the unporous membrane material S1 was thermally relaxed by 4% at 136° C. in the TD to obtain a porous film.

Comparison Example 2

A resin composition which is a mixture of eight parts by mass of ultrahigh molecular weight polyethylene (GHR 8110 produced by Ticona Corporation, viscosity-average molecular weight: 0.5 million), 16 parts by mass of ultrahigh molecular weight polyethylene (Hizex 145M produced by Mitsui Chemicals, Inc., viscosity-average molecular weight: one million), and 76 parts by mass of paraffin wax (130 produced by Nippon Seiro Co., Ltd.) was extruded at 170° C. from the T-die of the co-rotation twin screw extruder to obtain an unporous membrane material S5.

After the unporous membrane material S5 was stretched 2.5 times longer than its original length at 40° C. in the MD, the unporous membrane material S5 was sequentially biaxially stretched 6.0 times longer than its original length at 110° C. in the TD. Thereafter the unporous membrane material S5 was immersed in isopropanol having a temperature of 65° C. to extract the paraffin wax. The obtained film was thermally fixed at 115° C. by using a roll stretching machine. In the thermal fixation, the roll speed ratio was so adjusted that the stretching ratio in the MD was 1.2 times longer than its original length. In this manner, a porous film was obtained.

Comparison Example 3

After the polypropylene resin (Prime Polypro "F300SV" produced by Prime Polymer Co., Ltd., MFR: 3 g/10 minutes, PP) and high-density polyethylene ("HiZex-2200J produced by Prime Polymer Co., Ltd., MFR: 5.2 g/10 minutes, PE) were extruded at 200° C. from T-dies of different extruders each having 4 mm in its lip gap through the feedblock for forming a film having the two-kind three-layer structure, the polypropylene resin and the high-density polyethylene were laminated one upon another in such a way that the thickness ratio PP/PE/PP among two layers of the polypropylene resin (PP) and one layer of the high-density polyethylene (PE) was 1/1/1. After they were dropped to the casting roll having a temperature of 90° C., they were wound around the winder to obtain a laminated unporous membrane material S6.

The unporous membrane material S6 was left for 24 hours in a circulating hot air oven heated to 120° C. to thermally treat it. After the unporous membrane material S6 thermally treated was stretched 1.7 times longer than its original length at 25° C. in the MD and further stretched 2.0 times longer than its original length at 100° C. in the MD to obtain a porous film.
(1) Measurement of Average Flow Rate Diameter Pressure ($P_{AP}$) and Bubble Point Pressure ($P_{BP}$)

The average flow rate diameter pressure ($P_{AP}$) and bubble point pressure ($P_{BP}$) of the porous polyolefin resin film of each of the examples and the comparison examples were measured by using a Palm Porometer (produced by Porous Materials, Inc.). The average flow rate diameter pressure ($P_{AP}$) thereof and the bubble point pressure ($P_{BP}$) thereof were measured in conformity to ASTM F316-86 by using a polyhexafluoropropene-based solution (GALWICK produced by Porous Materials, Inc., surface tension: 15.6 dyne s/cm) as a test solution.
(2) Measurement of Air Permeability (Pa)

The air permeability (second/100 ml) of each porous polyolefin resin film was measured in accordance with JIS P8117 in an atmosphere having a temperature of 25° C. A digital Oken type air permeability tester (produced by Asahi Seiko Co., Ltd.) was used to measure the air permeability thereof.
(3) Measurement of Thickness The in-plane thickness of each porous polyolefin resin film was measured at unspecified 30 points thereof with a dial gauge 1/1000 mm. The average of the measured values is shown as the thickness thereof.
(4) Measurement of Porosity To determine the porosity of each porous polyolefin resin film, a substantial amount W1 thereof was measured. Thereafter a mass W0 was computed when the porosity thereof was 0% from the density and thickness of the resin composition. From the value of the substantial amount W1 and that of the mass W0, the porosity thereof was determined based on an equation shown below.

Porosity (%)={(W0−W1)/W0}×100

(5) Measurement of Electric Resistance

After a specimen having a dimension of 3.5 cm square was cut out of each porous polyolefin resin film in an atmosphere having a temperature of 25° C., the specimen was put in a glass petri dish. Thereafter a solution (produced by Kishida Chemical Co., Ltd.), containing 1M of lithium perchlorate, which consisted of propylene carbonate and ethyl methyl carbonate at a ratio of 1:1 (v/v) was put in the glass petri dish to such an extent that the surface of the porous film was covered with the solution to permeate the solution into the porous film. After the porous film was taken out of the glass petri dish, excess electrolytic solution was wiped away. Thereafter the specimen was placed at the center of a stainless petri dish having a diameter of ϕ60 mm. After a 100 g stainless weight which was ϕ30 mm in its bottom surface was slowly placed on the specimen, a terminal was connected to the stainless petri dish and the weight respectively. In this manner, the electric resistance of the specimen was measured by using a HIOKI LCR HiTESTER (model number: 3522-50 produced by HIOKI E.E. CORPORATION).

(6) SD Property

Figure 2A:
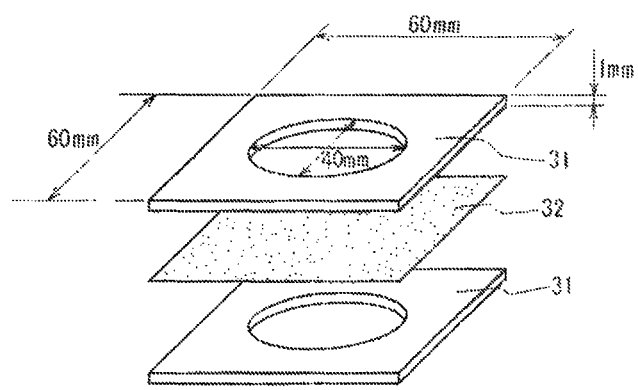
FIG. 2A explains a method of fixing the porous polyolefin resin film in measuring its shut-down property (SD property), heat resistance, and X-ray diffraction; namely, sandwiching a porous polyolefin resin specimen having a dimension of 60 mm square between two aluminum plates having a circular hole formed in a central portion.
Figure 2B:
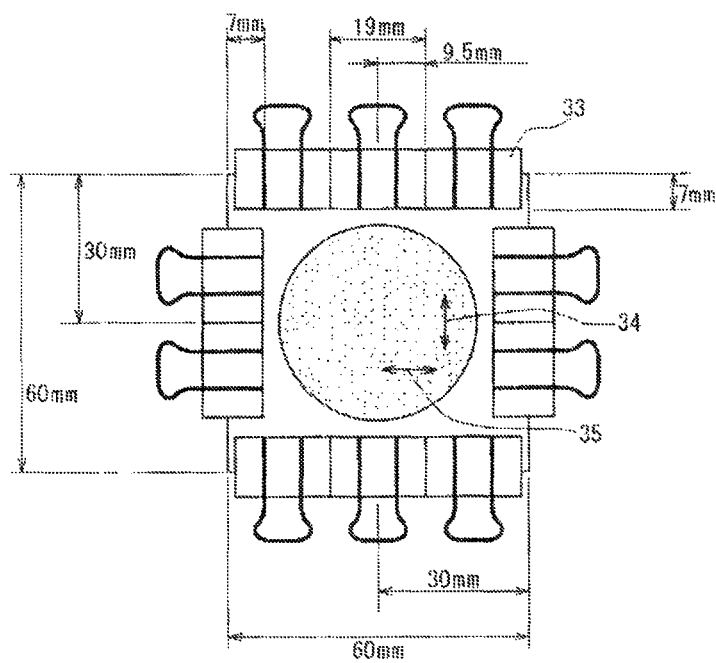
FIG. 2B further explains the method of fixing the porous polyolefin resin film in measuring its shut-down property (SD property), heat resistance, and X-ray diffraction; namely, fixing the periphery of each porous polyolefin resin film specimen of FIG. 2A with clips.

After a specimen having a dimension of 60 mm square was cut out of each porous polyolefin resin film, as shown in FIG. 2(A), each specimen was sandwiched between two aluminum plates (material: JIS A5052, size: 60 mm in the length direction, 60 mm in the width direction) where a circular hole having a diameter of ϕ40 mm was formed at the central portion. Thereafter as shown in FIG. 2(B), the periphery of each specimen was fixed with clips (double clip "kuri-J35" produced by KOKUYO Co., Ltd.). Thereafter each specimen restrained by the two aluminum plates was immersed at a central portion of an oil bath (OB-200A produced by As One Co., Ltd.), having a temperature of 135° C., in which glycerin (first class produced by Nacalai Tesque Inc.) was filled up to 100 mm from its bottom surface. The specimen was heated for five seconds. Immediately after the heating finished, the specimen was immersed in a separately prepared cooling bath in which glycerin having a temperature of 25° C. was filled to cool the specimen for five minutes. After the specimen was cleaned with 2-propanol (high grade, produced by Nacalai Tesque Inc.) and acetone (high grade, produced by Nacalai Tesque Inc.), the specimen was dried for 15 minutes in an air atmosphere having a temperature of 25° C. The air permeability of each of the dried specimen was measured in accordance with the method used in the above-described method (2). The results of the measurement were classified as follows. Specimens marked with ⊚ and ○ were evaluated as being acceptable.

⊚: not less than 80000 seconds/100 ml
○: not less than 40000 seconds/100 ml and less than 80000 seconds/100 ml
Δ: not less than 10000 seconds/100 ml and less than 40000 seconds/100 ml
x: less than 10000 seconds/100 ml (7) Measurement of β Crystal Activity by Differential Scanning calorimeter (DSC)

By using a differential scanning calorimeter (DSC-7) produced by PerkinElmer Inc., each porous polyolefin resin film was heated from 25° C. up to 240° C. at a heating speed of 10° C./minute and allowed to stand for one minute. Thereafter the porous polyolefin resin film was cooled from 240° C. down to 25° C. at a cooling speed of 10° C./minute and allowed to stand for one minute. Thereafter the porous polyolefin resin film was heated again from 25° C. up to 240° C. at the heating speed of 10° C./minute. When the porous polyolefin resin film was heated again from 25° C. up to 240° C., whether it had the β crystal activity or not was evaluated based on the following standard according to whether a peak was detected in the range of 145° C. to 160° C. which is the crystalline melting peak temperature (Tmβ) derived from the β crystal of the polypropylene resin.

○: Porous polyolefin resin films in which Tmβ was detected in the range of 145° C. to 160° C. (they had β crystal activity).

x: Porous polyolefin resin films in which Tmβ was not detected in the range of 145° C. to 160° C. (they did not have β crystal activity).

The β activity of each porous polyolefin resin film having a weight of 10 mg was measured in a nitrogen atmosphere.

(8) Measurement of β Crystal Activity by Wide-Angle X-Ray Diffraction Apparatus (XRD)

A specimen having a dimension of 60 mm square was cut out of each porous polyolefin resin film and fixed as shown in FIGS. 2(A) and 2(B).

Each specimen fixed to two aluminum plates was put in a blow isothermal instrument (DKN602 produced by Yamato Science Corporation) having a set temperature of 180° C. and a display temperature of 180° C. After the specimen was allowed to stand therein for three minutes, the set temperature was altered to 100° C. Thereafter the specimen was gradually cooled for not less than 10 minutes to cool it to 100° C. When the display temperature became 100° C., the specimen was taken out of the blow isothermal instrument. Thereafter the specimen was cooled for five minutes in an atmosphere having a temperature of 25° C. with the specimen being fixed to the two aluminum plates. Thereafter wide-angle X-ray diffraction measurement was carried out on the circular central portion of the specimen having a diameter of ϕ40 mm in the following measuring conditions.

Wide-angle X-ray diffraction measuring apparatus: Model Number: XMP18A produced by Mac Science Co., Ltd.
X-ray source: CuK-α ray, output: 40 kV, 200 mA
Scanning method: 2θ/θ scan, 2θ range: 5° to 25°, scanning interval: 0.05°, scanning speed: 5°/minute 3 Obtained diffraction profiles were checked to evaluate whether or not the films had the β crystal activity according to whether a peak derived from a (300) surface of the β crystal of the polypropylene resin was detected in the range of 2θ=16.0° to 16.5°.

○: Films in which the peak was detected in the range of 2θ=16.0° to 16.5° (films had the β activity)
x: Films in which the peak was not detected in the range of 2θ=16.0° to 16.5° (films did not have the β activity)

4 In the case where the specimen having the dimension of 60 mm square cannot be cut out of each porous polyolefin resin film, a specimen may be prepared by disposing the film at a ϕ40 mm circular hole formed at a central portion of each aluminum plate.

(9) Wettability

A solution (produced by Kishida Chemical Co., Ltd.), containing 1M of lithium perchlorate, which consisted of propylene carbonate and ethyl methyl carbonate at a ratio of 1:1 (v/v) was used as an electrolytic solution.

After a specimen having a dimension of 20 mm square was cut out of each porous polyolefin resin film, the mass (Wa) thereof was measured. Thereafter the specimen was entirely dipped in the electrolytic solution having a volume of 10 mL for five seconds. Thereafter the specimen was taken out of the electrolytic solution. Immediately after the electrolytic solution which attached to the surface of the specimen was blown away with an air spray, the mass (Wb) thereof was measured. From the above-described numerical values, the wet percentage of each specimen was computed based on an equation shown below.

Wet percentage (%) = $100 \times (Wb - Wa)/Wb$

The wet percentage was classified as shown below. Specimens to which marks ⊚ and ○ were put were acceptable. The reference symbol P indicates the porosity of the specimen.

⊚: not less than 1.20×P, less than 1.35×P
○: not less than 1.00×P, less than 1.20×P
x: less than 1.00×P

TABLE 1

| | | Example 1 | Example 2 | Example 3 | Example 4 | Example 5 | Comparison example 1 | Comparison example 2 | Comparison example 3 |
|---|---|---|---|---|---|---|---|---|---|
| Bubble point pressure($P_{BP}$) | kPa | 888 | 945 | 839 | 855 | 1074 | 1157 | 310 | 1664 |
| Bubble point pore diameter | μm | 0.051 | 0.048 | 0.054 | 0.053 | 0.042 | 0.039 | 0.145 | 0.027 |
| Average flow rate diameter pressure($P_{AP}$) | kPa | 1947 | 1960 | 1978 | 2067 | 1960 | 2074 | 583 | 2201 |
| Average flow rate diameter | μm | 0.023 | 0.023 | 0.023 | 0.022 | 0.023 | 0.022 | 0.077 | 0.020 |
| Air permeability($P_a$) | sec/100 ml | 185 | 266 | 206 | 244 | 186 | 450 | 110 | 429 |
| $P_a/P_{BP}$ | sec/(100 ml · kPa) | 0.21 | 0.28 | 0.25 | 0.29 | 0.17 | 0.39 | 0.36 | 0.26 |
| $P_a/P_{AP}$ | sec/(100 ml · kPa) | 0.10 | 0.14 | 0.10 | 0.12 | 0.09 | 0.22 | 0.19 | 0.19 |
| Thickness | μm | 42 | 34 | 55 | 39 | 22 | 19 | 23 | 21 |
| Porosity | % | 77 | 71 | 71 | 70 | 59 | 52 | 44 | 43 |
| Electric resistance | Ω | 0.72 | 0.83 | 0.74 | 0.75 | 0.76 | 0.88 | 0.93 | 0.90 |
| SD property | — | — | — | ◎ | ○ | ◎ | ◎ | ◎ | ◎ |
| DSC | — | ○ | ○ | ○ | ○ | ○ | ○ | X | X |
| XRD | — | ○ | ○ | ○ | ○ | X | ○ | X | X |
| Wettability | — | ○ | ○ | ○ | ◎ | ○ | ○ | X | X |

The porous polyolefin resin film of each of the examples 1 through 5 allowed the wettability of the electrolytic solution to be excellent because the average flow rate diameter pressure ($P_{AP}$) thereof was in the predetermined range of 1500 to 2500 kPa. The ratio (Pa/$P_{BP}$) of the air permeability (Pa) of each porous polyolefin resin film to the bubble point pressure ($P_{BP}$) thereof was in the predetermined range of 0.03 to 0.35 seconds/(100 ml·kPa). The electric resistance of each porous polyolefin resin film was as low as not more than 0.85. The ratio (Pa/$P_{AP}$) of the air permeability (Pa) of each porous polyolefin resin film to the average flow rate diameter pressure ($P_{AP}$) thereof was in the predetermined range of 0.03 to 0.18 seconds/(100 ml·kPa). Because each porous polyolefin resin film had the above-described properties, the porous polyolefin resin film used as the separator for the nonaqueous electrolyte battery allowed it to have a high output. Because in the porous polyolefin resin film of each of the examples 3 and 4, the layer of the resin composition containing the polyethylene resin as its main component was laminated on the layer of the resin composition containing the polypropylene resin as its main component, the SD property could be imparted to the porous polyolefin resin film.

On the other hand, the $P_{AP}$, $P_{BP}$, Pa/$P_{BP}$, and Pa/$P_{AP}$ of the porous polyolefin resin film of each of the comparison examples were out of the predetermined range. Thus the electric resistances thereof were high and in addition the electrolytic solutions were insufficient in the wettability thereof.

INDUSTRIAL APPLICABILITY

The porous polyolefin resin film of the present invention is applicable to various uses in which air-permeable characteristic is demanded. The porous polyolefin resin film can be suitably used as the separator of the lithium battery; materials for hygienic products such as disposable diaper, body fluid-absorbing pats such as sanitary products, a bed sheet, and the like; materials for medical supplies such as surgical gown, a base material for stupe, and the like; materials for clothing items such as jumper, sportswear, rainwear, and the like; building materials such as wallpaper, a roof-waterproofing material, a heat insulation material, a sound-absorbing material, and the like; materials for a container of a desiccant, a moisture-proof agent, a deoxidizer, a pocket warmer; and packaging materials for keeping foods fresh and for packaging foods.

EXPLANATION OF REFERENCE SYMBOLS AND NUMERALS

10: separator for battery
20: secondary battery
21: positive electrode plate
22: negative electrode plate
24: positive lead
25: negative lead
26: gasket
27: positive lid
31: aluminum plate
32: porous polyolefin resin film
33: clip
34: length direction of film
35: width direction of film

The invention claimed is:

1. A polyolefin resin porous film containing:
a polyolefin resin as a main component thereof, wherein an average flow rate diameter pressure (PAP) is set to 1500 to 2500 kPa, a bubble point pressure (PBP) is set to 300 to 1500 kPa, and a ratio of an air permeability (Pa) to said bubble point pressure (PBP) is set to not more than 0.35 seconds/(100 ml·kPa) and
wherein the polyolefin resin porous film has an electric resistance of not more than 0.85Ω.

2. The polyolefin resin porous film according to claim 1, wherein said air permeability (Pa) is set to not more than 2000 seconds/100 ml.

3. The polyolefin resin porous film according to claim 1, wherein a ratio of said air permeability (Pa) to said average flow rate diameter pressure (PAP) is set to not more than 0.18 seconds/(100 ml·kPa).

4. The polyolefin resin porous film according to claim 1, wherein said polyolefin resin contains not less than 30 mass % of polypropylene resin.

5. The polyolefin resin porous film according to claim 1, wherein said polyolefin resin has a β crystal activity.

6. The polyolefin resin porous film according to claim 1, having a porosity of 20 to 80%.

7. The polyolefin resin porous film according to claim 1, having a thickness of 3 to 100 μm.

8. A separator for a nonaqueous electrolyte battery consisting of a polyolefin resin porous film according to claim 1.

* * * * *